US011870147B2

(12) United States Patent
Poulsen et al.

(10) Patent No.: US 11,870,147 B2
(45) Date of Patent: Jan. 9, 2024

(54) GRADIENT STRUCTURE FOR TRANSMITTING AND/OR REFLECTING AN ELECTROMAGNETIC SIGNAL

(71) Applicant: SAAB AB, Linköping (SE)

(72) Inventors: Sören Poulsen, Hamneda (SE); Philip Bergander, Linköping (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 18/245,483

(22) PCT Filed: Sep. 13, 2021

(86) PCT No.: PCT/SE2021/050877
§ 371 (c)(1),
(2) Date: Mar. 15, 2023

(87) PCT Pub. No.: WO2022/066083
PCT Pub. Date: Mar. 31, 2022

(65) Prior Publication Data

US 2023/0275355 A1 Aug. 31, 2023

(30) Foreign Application Priority Data

Sep. 25, 2020 (SE) .................................... 2000174-9

(51) Int. Cl.
*H01Q 15/00* (2006.01)
*H01Q 1/42* (2006.01)

(52) U.S. Cl.
CPC ......... *H01Q 15/0013* (2013.01); *H01Q 1/424* (2013.01)

(58) Field of Classification Search
CPC ...................................................... H01Q 1/424
See application file for complete search history.

(56) References Cited

U.S. PATENT DOCUMENTS 2,985,880 A * 5/1961 McMillan .............. H01Q 15/08 428/118
5,652,631 A * 7/1997 Bullen ................... H01Q 1/425 343/753

(Continued)

FOREIGN PATENT DOCUMENTS

CN 110406178 A 11/2019
EP 3485533 A1 5/2019

OTHER PUBLICATIONS

Chen, Jin, et al., "Ultrabroadband Three-Dimensional Printed Radial Perfectly Symmetric Gradient Honeycomb All-Dielectric Dual-Directional Lightweight Planar Luneburg Lens", ACS Applied Materials & Interfaces, Sep. 13, 2018, pp. 38404-38409, vol. 10, American Chemical Society, US.

(Continued)

*Primary Examiner* — Awat M Salih
(74) *Attorney, Agent, or Firm* — Alston & Bird LLP

(57) ABSTRACT

The present disclosure relates to a gradient structure (100) for transmitting and/or reflecting an electromagnetic signal. The gradient structure comprises a plurality of interconnected cells (110). Each cell comprises a through cavity (112) surrounded by walls (111), wherein the walls of each cell have a gradually varying thickness along a longitudinal direction of each cell. The present disclosure also relates to a cover structure (200) comprising the gradient structure (100), a system (300) comprising the cover structure (200), a structure element (400) having integrated therein the system (300) and to a method for optimizing the transmittance and/or reflectance of an electromagnetic signal of a gradient structure.

27 Claims, 10 Drawing Sheets

(56) References Cited

U.S. PATENT DOCUMENTS

| | | | | |
|---|---|---|---|---|
| 8,493,281 | B2 * | 7/2013 | Lam | H01Q 19/06 343/753 |
| 2003/0034933 | A1 * | 2/2003 | Frenkel | H01Q 17/00 343/872 |
| 2013/0224405 | A1 * | 8/2013 | Nagerl | H05K 7/14 428/116 |
| 2018/0366821 | A1 | 12/2018 | Crouch et al. | |
| 2019/0036214 | A1 | 1/2019 | Cheng et al. | |
| 2020/0018874 | A1 * | 1/2020 | Chisum | H01Q 15/10 |
| 2021/0021050 | A1 * | 1/2021 | Kim | H01Q 1/3283 |

OTHER PUBLICATIONS

Ghosh, Saptarshi, et al., "Lightweight 3-D Printed Metamaterial for Electromagnetic Wave Absorption", 2018 International Symposium on Antennas and Propagation (ISAP), Oct. 23-26, 2018, 2 pages, IEEE, Korea.

International Searching Authorities, International Search Report and Written Opinion received for International Application No. PCT/SE2021/050877, dated Nov. 3, 2021, 11 pages, Swedish Patent and Registration Office, Sweden.

Pei, Zhao, et al., "Electromagnetic property of a novel gradient honeycomb composite fabricated by 3D forming", Journal of Magnetism and Magnetic Materials, 2020 (published online Aug. 26, 2019), 9 pages, vol. 493, No. 165742, Elsevier BV, The Netherlands.

Swedish Patent and Registration Office, Swedish Search Report received for Application No. 2000174-9, dated May 10, 2021, 3 pages, Sweden.

* cited by examiner

GRADIENT STRUCTURE FOR TRANSMITTING AND/OR REFLECTING AN ELECTROMAGNETIC SIGNAL

CROSS REFERENCE TO RELATED APPLICATIONS

This application is a National Stage Application, filed under 35 U.S.C. § 371, of International Application No. PCT/SE2021/050877, filed Sep. 13, 2021, which international application claims priority to and the benefit of Swedish Application No. 2000174-9, filed Sep. 25, 2020; the contents of both of which as are hereby incorporated by reference in their entireties.

BACKGROUND

Related Field

The present disclosure relates to a gradient structure for transmitting and/or reflecting an electromagnetic signal, a cover structure comprising the gradient structure, a system comprising the cover structure, and a structure element having integrated therein the system. The present disclosure also a method for optimizing the transmittance and/or reflectance of an electromagnetic signal of a gradient structure.

Description of Related Art

Structures for transmitting and/or reflecting electromagnetic signals in radio frequency applications are known. Examples of such structures are made of composites or foam, or honeycomb structures made of paper.

New generations of transmitters/receivers operate within a larger bandwidth range as compared to earlier generations of transmitters/receivers. Another trend is that a plurality of transmitters/receivers operating in different bandwidth ranges are arranged within the same structure. Hence, it is desirable that such structure has the ability to transmit/reflect electromagnetic signals within a large bandwidth range or within a plurality of independent frequency bands. At the same time, the structure has to be thick enough in order to withstand the environmental conditions in which the structure is operating in.

There is thus need for an improved structure which is arranged to transmit and/or reflect electromagnetic signals within a large range of bandwidths or within a plurality of independent frequency bands, and which at the same time is mechanically resistant. There is also need for a method for optimizing the transmittance and/or reflectance of such a structure.

BRIEF SUMMARY

An object of the present disclosure is to provide a solution for obtaining a gradient structure wherein some of the problems with prior art technologies are mitigated or at least alleviated.

The disclosure proposes a gradient structure for transmitting and/or reflecting an electromagnetic signal. The gradient structure comprises a plurality of interconnected cells, wherein each cell comprises a through cavity surrounded by walls. The walls of each cell have a gradually varying thickness along a longitudinal direction of each cell.

By the gradient structure it is possible to transmit and/or reflect an electromagnetic signal within a large bandwidth range or within a plurality of independent frequency bands.

The gradient structure may be used in a large number of applications, such as in cars, aircrafts, watercrafts and buildings for transmitting and/or reflecting an electromagnetic signal. Further, the gradient structure is mechanically resistant.

According to some aspects, each cell is built up of a plurality of layers extending across a longitudinal direction of each cell.

By building up each cell by a plurality of layers it may be possible to obtain a permittivity in each of each of the layers such that the gradient structure is transmissive or reflective to an electromagnetic signal. It may also be advantageously to divide each cell into a plurality of layers upon optimization of the gradient structure since the optimization of the gradient structure and/or a cover structure may be facilitated.

According to some aspects, the density is gradually varying in different layers of the cells.

According to some aspects, the gradient structure is configured to transmit and/or reflect an electromagnetic signal within at least one predetermined bandwidth range.

Hence, it is possible to provide a gradient structure with the ability to transmit and/or reflect an electromagnetic signal within a large bandwidth range or within a plurality of independent frequency bands.

According to some aspects, a thickness of the walls of the cells is selected to obtain a permittivity of each layer of the gradient structure such that the gradient structure is transmissive or reflective to an electromagnetic signal, within the at least one predetermined bandwidth range.

The gradient structure may be transmissive and/or reflective to an electromagnetic signal within a large range of bandwidths or within a plurality of independent frequency bands.

According to some aspects, the cells of the plurality of interconnected cells have a different diameter and/or geometrical shape.

By a different diameter and/or geometrical shape, the gradient structure may be designed to have different transmittance/reflectance properties in different directions of the gradient structure. The diameter and/or geometrical shape may be chosen to be suitable for a specific application of the gradient structure.

According to some aspects, the cells have a hexagonal shape or any other geometrical shape.

A hexagonal shape provides for a robust gradient structure. The hexagonal shape is also advantageous due to its symmetry in the transversal direction of the cell.

According to some aspects, the gradient structure is provided with an additional layer, such as a conductive layer, a frequency selective surface, or a skin, which is arranged to transmit, reflect, filter or absorb wavelengths within the at least one predetermined bandwidth range.

Hence, it is possible to provide a gradient structure wherein different transmittance, reflectance, filtering and/or absorbing properties may be provided depending on the application of the gradient structure.

According to some aspects, the gradient structure comprises a plurality of gradient structures arranged on top of each other, wherein the plurality of gradient structures being separated by at least one additional layer.

By this configuration, it is possible to obtain gradient structures with desired transmittance, reflectance, filtering or absorbing properties. It also provides for a more mechanically robust gradient structure.

According to some aspects, the diameter of each cell is smaller than the smallest wavelength within the at least one predetermined bandwidth range.

By this configuration, the gradient structure appears homogeneous to the electromagnetic signal, and grating lobes, i.e. lobes which occur when the lobe from the transmitter is split into a plurality of lobes upon being transmitted through the gradient structure, from the gradient structure is avoided.

According to some aspects, the walls of the cells comprises a dielectric material.

According to some aspects, the cavity comprises a dielectric material, which is different from the dielectric material of the walls.

According to some aspects, each cell further comprises a conductive material, such as a metal or a conductive polymer.

By this configuration, the gradient structure may be provided with different transmittance and/or reflectance properties in different portions of the gradient structure.

According to some aspects, the gradient structure is planar or curved.

Hence, the gradient structure may be adapted to a specific application. For example, it may be shaped such that it is suitable for a certain structure element, for example a front portion of a car, a nose portion of an aircraft etc.

According to some aspects, the gradient structure is designed as a lens.

By designing the gradient structure as a lens, electromagnetic signals from a transmitter arranged adjacent to the gradient structure may be focused, thereby improving the performance of the transmitter.

The present disclosure also relates to a cover structure. The cover structure comprises at least one gradient structure. The cover structure further comprises at least one skin attached to the topmost and/or bottommost portion of the gradient structure.

The cover structure may for example be a radome, i.e. a structural weatherproof enclosure arranged to protect an antenna. Such a cover structure has a large number of applications, such as in road vehicles, aircrafts, watercrafts and buildings. The cover structure may be arranged to operate within a large bandwidth range or within a plurality of independent frequency bands. Thus, the cover structure may be suitable for covering a plurality of transmitters/receivers operating within a large bandwidth range, or within a plurality of independent frequency bands.

The purpose of the skin is to protect the gradient structure against mechanical stress and/or weather, such as rain and wind.

According to some aspects, the thickness of the walls is selected to obtain a permittivity of each layer of the gradient structure such that reflections in the gradient structure substantially cancel or increase reflections in the gradient structure caused by the skin.

By substantially cancelling the reflections in the gradient structure caused by the skin, the transmittance of the gradient structure may be optimized in each of the plurality of layers of the gradient structure. By increasing the reflections in the gradient structure caused by the skin, the reflectance of the gradient structure may be optimized in each of the plurality of layers in the gradient structure.

According to some aspects, the at least one skin is made of a composite material.

A skin made of a composite material is resistant and protects the gradient structure against mechanical stress and/or weather conditions.

The present disclosure also relates to a system. The system comprises at least one transmitter and/or receiver and a cover structure.

Such a system has a large number of applications, such as in road vehicles, aircrafts, watercrafts and buildings. Since the gradient structure has the ability to transmit and/or reflect an electromagnetic signal within a large bandwidth range or within a plurality of independent frequency bands, such a system may be suitable for a plurality of transmitters/receivers operating within a large bandwidth range, or within a plurality of independent frequency bands.

The present disclosure also relates to a structure element having integrated therein the system. An outer surface of the cover structure forms part of a surface of the structure element.

Hence, the system may be integrated in a structure element, such as a road vehicle, a watercraft, an aircraft, or a building.

The present disclosure also relates to a method for optimizing the transmittance and/or reflectance of an electromagnetic signal of a gradient structure. The gradient structure comprises a plurality of interconnected cells, wherein each cell comprises a through cavity surrounded by walls. The method comprises, selecting at least one bandwidth range, within which the gradient structure should transmit and/or reflect the electromagnetic signal. The method further comprises selecting at least one incident angle of a transmitter and/or a receiver arranged within the gradient structure. The method further comprises selecting a thickness of the gradient structure. The method further comprises dividing each cell into a plurality of layers extending across a longitudinal direction of the cell. The method further comprises optimizing values of the permittivity for each of the plurality of layers in order to maximize the performance of the gradient structure. The method further comprises selecting a cell diameter for the cells, wherein the cell diameter is smaller than the smallest wavelength within the at least one bandwidth range. Finally, the method comprises selecting the wall thickness for each layer of the cell such that the permittivity of each of the plurality of layers corresponds to the optimized permittivity values.

This method provides an efficient and time saving method of optimizing the transmittance and/or reflectance of an electromagnetic signal of a gradient structure.

According to some aspects, the method further comprises a step of providing at least one additional layer with a known permittivity, to the topmost and/or bottommost portions of the gradient structure prior to the step of dividing each cell into a plurality of layers.

Hence, presence of additional layer(s) of the gradient structure may be taken into account upon performing the optimization.

According to some aspects, the step of optimizing values of the permittivity is performed by any optimization method, such as the gradient descent projection method.

This is an efficient method for optimizing values of the permittivity.

According to some aspects, in the step of optimizing values of the permittivity, the transmittance or reflectance of the gradient structure is calculated by a scattering parameter calculation method for stratified media.

According to some aspects, inverse homogenization is performed in the step of selecting a wall thickness for each layer of the cell such that the permittivity of each of the plurality of layers corresponds to the optimized permittivity values.

According to some aspects, the method further comprises a step of converting the plurality of layers into a continuous layer.

The division into a plurality of layers may be advantageously upon optimization of the gradient structure. However, upon manufacturing, it may be chosen whether the gradient structure should be comprised of these sharp layers, or if the layers should be manufactured as a continuous layer.

According to some aspects, the method further comprises a step of manufacturing the gradient structure and/or optional additional layers by 3D printing.

3D printing, i.e. additive manufacturing, is an efficient way of realizing any optimized gradient structure according to the present disclosure. Both the gradient structure and any additional layers of e.g. a cover structure may be manufactured by 3D printing.

DETAILED DESCRIPTION OF VARIOUS EMBODIMENTS

The present disclosure relates to a gradient structure for transmitting and/or reflecting an electromagnetic signal, a cover structure comprising the gradient structure, a system comprising the cover structure, and a structure element having integrated therein the system. The present disclosure also a method for optimizing the transmittance and/or reflectance of an electromagnetic signal of a gradient structure.

Figure 1A:
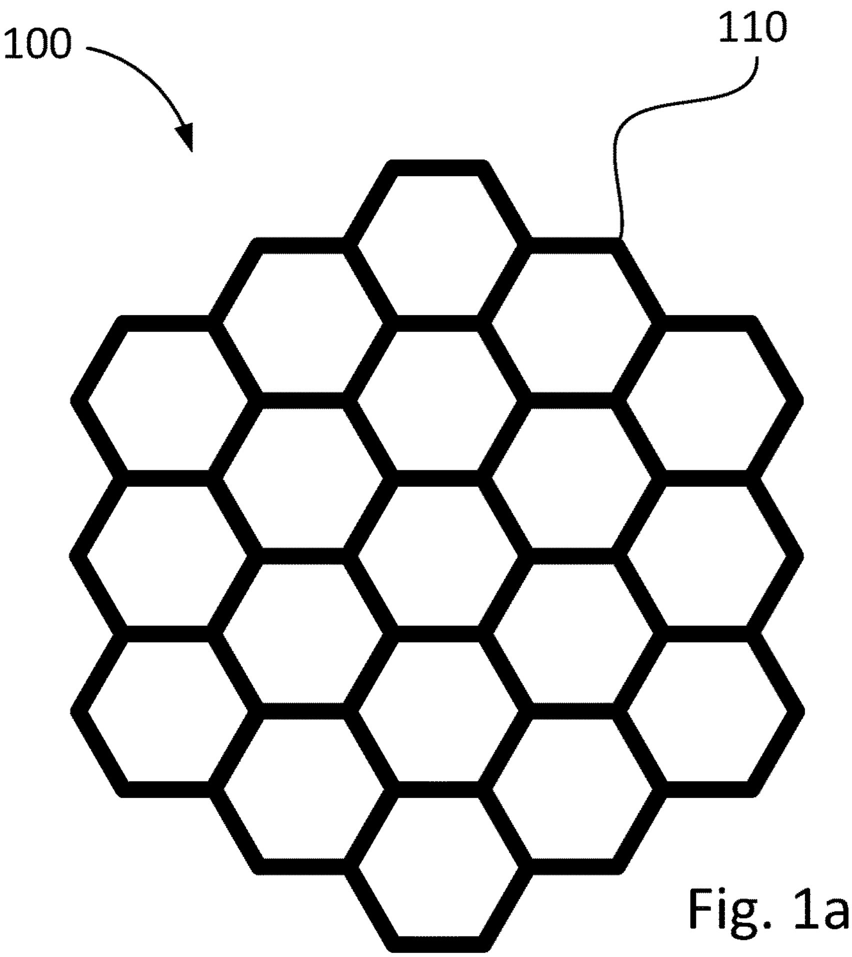
FIG. 1*a* and FIG. 1*b* show a top view of a portion of a gradient structure and of a cell, respectively, according to an example of the present disclosure.

FIG. 1*a* shows a top view of a portion of a gradient structure 100 according to an example of the present disclosure. The gradient structure 100 comprises a plurality of interconnected cells 110. Each cell 110 of the gradient structure 100 has a geometrical shape. The cells 110 may have any geometrical shape, such as triangular, rectangular, pentagonal or hexagonal etc. In the gradient structure 100 shown in FIG. 1*a*, each cell 110 has a hexagonal geometric shape, such that the interconnected cells of the gradient structure 100 forms a honeycomb structure. A cell with hexagonal geometrical shape may, but need not, be regular. By regular hexagonal geometrical shape is meant that the cell is a hexagon which is both equilateral and equiangular.

As will be discussed below, all the cells 110 of a gradient structure 100 may have the same geometrical shape, such as the gradient structure 100 illustrated in FIG. 1*a*. Alternatively, the interconnected cells 110 of a gradient structure 100 may have different geometrical shape, i.e. a combination of two or more geometrical shapes.

Figure 1B:
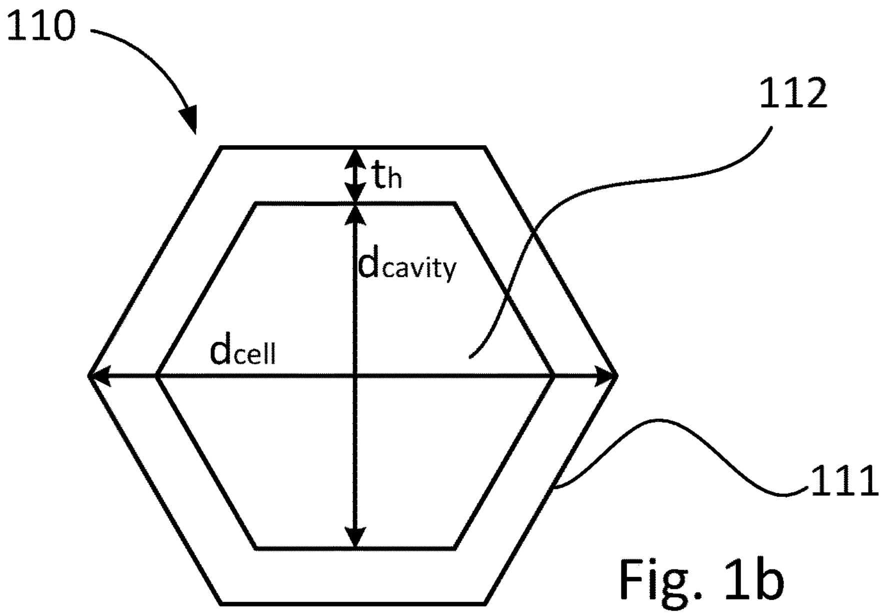

FIG. 1*b* illustrates a top view of a cell 110 according to an example of the present disclosure. The cell 110 comprises a through cavity 112 surrounded by walls 111. As illustrated in FIG. 1*b*, the cell 110 has cell diameter, $d_{cell}$, a cavity diameter $d_{cavity}$ and a wall thickness $t_h$. As will be discussed below, the walls of each cell have a gradually varying thickness $t_h$ along a longitudinal direction of each cell (not shown in FIG. 1*b*). Hence, also the cavity diameter $d_{cavity}$ may vary along a longitudinal direction of each cell 110. Typically, the cell diameter $d_{cell}$ may be in the range of about 5 mm. As will be discussed below, the wall thickness $t_h$ and the cavity diameter $d_{cavity}$ may be selected such that the gradient structure is arranged to transmit and/or reflect an electromagnetic signal within at least one predetermined bandwidth. In addition, the wall thickness $t_h$ and the thickness of the gradient structure $t_c$ (shown in FIG. 2*a*) may be selected such that the gradient structure 100 withstands the mechanical loads it is exposed for.

As illustrated in FIG. 1*a*, the cell diameter $d_{cell}$ and geometrical shape of each of the interconnected cells 110 may be periodic throughout the gradient structure. Alternatively, the cells 110 of the plurality of interconnected cells have a different diameter and/or geometrical shape. The gradient structure 100 may comprise of cells having a combination of two or more different cell diameters which are repeated in the gradient structure. In addition, the gradient structure may comprise of cells which have different wall thicknesses.

In another example, a first portion of a gradient structure 110 may be comprised of cells having a first geometrical shape while a second portion of the gradient structure 100 may be comprised of cells having a second geometrical shape which is different from the first geometrical shape.

In yet an example, a first portion of the gradient structure 100 may be comprised of cells 110 of a certain cell diameter $d_{cell}$ while a second portion of the gradient structure 100 may be comprised of cells 110 of a cell diameter $d_{cell}$ which is different from the cell diameter of the cells of the first portion of the gradient structure.

In a further example, a first portion of the gradient structure may be comprised of cells of a certain geometric shape and cell diameter, while a second portion of the gradient structure may be comprised of cells 110 of a geometrical shape and cell diameter $d_{cell}$ which is different from the first portion of the gradient structure 100. By varying the cell diameter $d_{cell}$ and/or geometrical shape of the gradient structure, different transmissive and/or reflective properties may be obtained in different portions of the gradient structure.

Figure 2A:
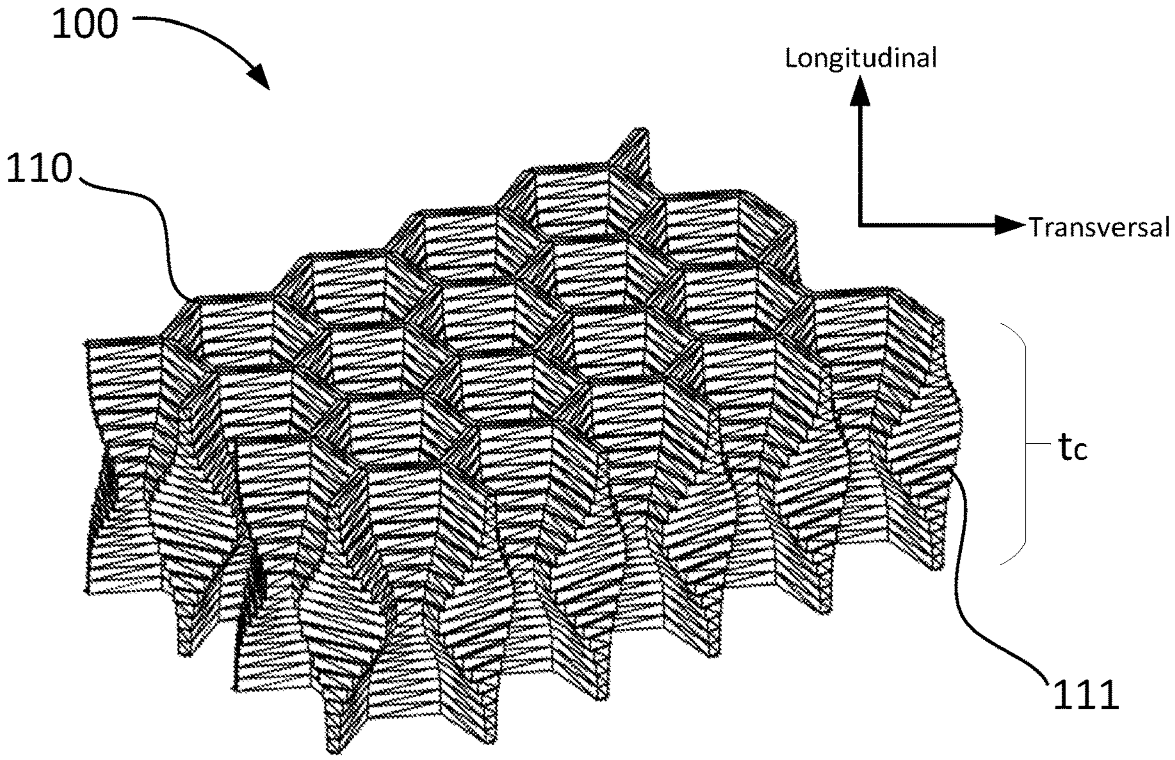
FIG. 2*a* and FIG. 2*b* show a side view of a gradient structure and a cross-sectional view of a cell, respectively, according to an example of the present disclosure.

FIG. 2*a* shows a side view of an example of a gradient structure 100 according to the present disclosure. The gradient structure 100 in FIG. 2*a* has a plurality of interconnected cells 110 with a hexagonal geometrical shape. The gradient structure has a thickness, $t_c$. The walls 111 of each cell 110 have a gradually varying thickness along a longitudinal direction of each cell.

In the example shown in FIG. 2*a*, the walls 111 of each cell 110 have a gradually decreasing thickness towards the topmost and bottommost portions of each cell 110 along a longitudinal direction of each cell. However, it should be understood that the wall thickness might vary in any other way within each cell 110 in order to obtain the properties of the gradient structure as discussed below.

Figure 2B:
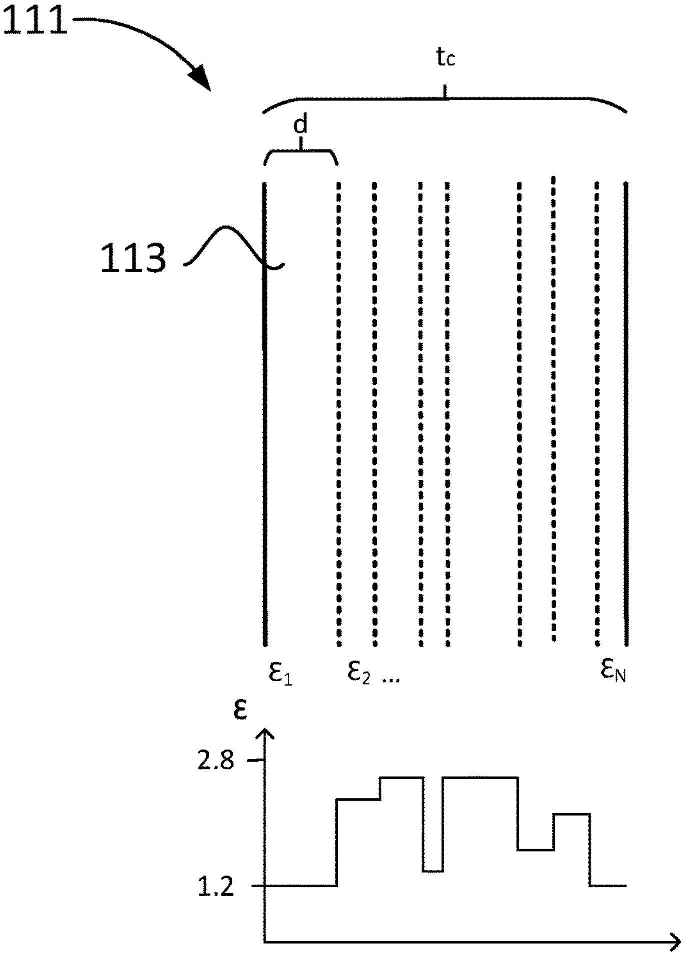

FIG. 2b shows a cross-sectional view of a cell of the gradient structure 100 shown in FIG. 2a. The gradient structure, and thus the cell, has a thickness $t_c$. In one example, each cell 110 may be built up of a plurality of layers extending across the longitudinal direction of each cell. The thickness of the walls 111 is then selected to obtain a permittivity in each layer of the gradient structure such that the gradient structure is transmissive or reflective to an electromagnetic signal of at least one predetermined bandwidth. As illustrated in FIG. 2b, the layers may be arranged as layers with a sharp interface between two adjacent layers, wherein each layer 113 has a thickness d. However, it should be understood that the plurality of layers may be seen as a continuous or artificial layer in which the plurality of layers merges into one another. As will be discussed more in detail below, each such layer may have a certain permittivity. Typically, each cell comprises in the order of ten such layers.

Each layer comprises a wall of a certain wall thickness, $t_h$ and thus a cavity of a certain cavity diameter $d_{cavity}$. Since the walls of each cell have a gradually varying thickness along a longitudinal direction of each cell, the relation between the amount of material of the walls and the material of the cavity, may vary in each layer of the cell.

The walls of the cells may comprise a dielectric material. The cavity may comprise a dielectric material, which is different from the dielectric material of the walls. Hence, the walls may comprise a dielectric material which has a different permittivity as compared to the permittivity of the cavity. The dielectric material of the walls and/or of the cavity may be a so-called lossy dielectric material. Alternatively, the dielectric material of the walls may be a so-called loss-less dielectric material. Dielectric loss relates to the inherent dissipation of electromagnetic energy, such as heat, of the material.

Each layer of the gradient structure thus has a certain permittivity ε, which also may be referred to as a dielectric constant. The permittivity ε of each layer of the cell hence depends on the wall thickness and cavity diameter, hence the relation between the amount of the dielectric material of the walls and the dielectric material of the cavity.

In one example, the dielectric material of the walls of the cells may be a plastics material, such as nylon.

In one example, the dielectric material of the cavity may be air. In yet another example, the cavity may comprise a dielectric material which has permittivity which is close to the permittivity of air.

Air has a relative permittivity which is close to 1.0. In one example, the dielectric material of the walls has a relative permittivity of about 2.8. Hence, a layer having a relative permittivity of 2.8 would comprise only the dielectric material of the walls, i.e. corresponding to a cell without a cavity, while a layer of relative permittivity of 1.0 would correspond to only air, i.e. corresponding to no other material, and thus no cell at all. Thus, a high permittivity in a layer typically corresponds to a thick wall in that layer. As shown in the lower portion of FIG. 2b, the permittivity may vary in each layer of the gradient structure.

The walls of the cells and/or the cavities of the gradient structure 100 may be made of the same dielectric material throughout the gradient structure. Alternatively, the gradient structure 100 may be comprised of more than one materials, for example of different dielectric materials in different layers of the walls and/or cavities of the gradient structure 100.

Since the thickness of the walls may vary, the density of the gradient structure may gradually vary in different layers of the cells of the gradient structure. In the example shown in FIG. 2a, the walls 111 of each cell 110 have a gradually decreasing thickness towards the topmost and bottommost portions of each cell. Hence, in that example, the density of the gradient structure is higher in the layers of a middle portion of the gradient structure as compared to a topmost portion and a bottommost portion of the gradient structure.

When transmitting an electromagnetic signal through the gradient structure it is typically desired that there be as little loss of the electromagnetic signal as possible. Alternatively, it may be desired to reflect electromagnetic signals of at least one predetermined bandwidth. However, upon transmission of an electromagnetic signal through the gradient structure, and optional other layers such as skin(s), a loss of the electromagnetic signal occurs due to reflections within the dielectric material and/or within optional other layers. By optimizing the permittivity of each of the layers of the gradient structure, i.e. selecting the thickness of the walls and the diameter of the cavity in each layer, the loss may be controlled and the transmittance and the reflectance of the gradient structure may thus be optimized.

The thickness of the walls may be selected to obtain a permittivity of each layer of the gradient structure such that the gradient structure is transmissive or reflective to electromagnetic signals within at least one predetermined bandwidth range. The thickness of the walls may be selected with regard to an application of the gradient structure, i.e. with regard to at least one predetermined bandwidth range in which the transmitter/and or receiver operate within as well as the angles of incidence of a transmitter and/or receiver arranged within the gradient structure.

Typically, the diameter of each cell $d_{cell}$ may be chosen such that it corresponds to the size of one wavelength or less of an electromagnetic signal within the at least one predetermined bandwidth range. Thereby the gradient structure appears homogeneous to the electromagnetic signal, and grating lobes, i.e. lobes which occur when the lobe from the transmitter is split into a plurality of lobes upon being transmitted through the gradient structure, from the gradient structure is avoided. In another example, the gradient structure may be designed to reflect electromagnetic signals within at least one predetermined bandwidth range by optimizing the permittivity of each of the layers for that purpose. Hence, the gradient structure may be designed such that it is transmissive to electromagnetic signals within at least one predetermined bandwidth range, while being reflective to electromagnetic signals within at least one other predetermined bandwidth range.

Figure 3:
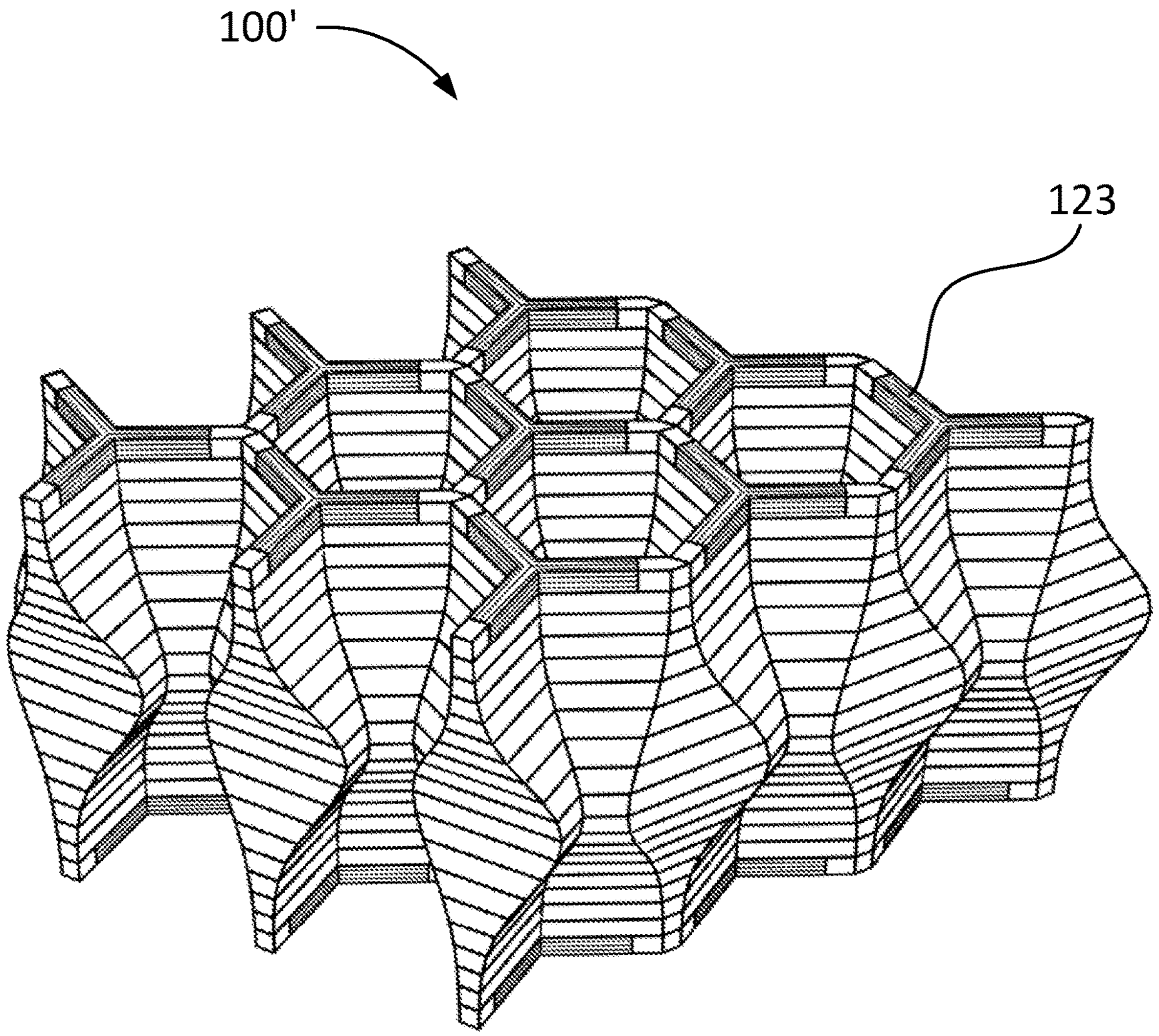
FIG. 3 show a gradient structure comprising interconnected conductive elements according to an example of the present disclosure.

Each cell of the gradient structure may further comprise a conductive material, such as a metal or a conductive polymer. In one example, the conductive material may be a so-called lossy material. The conductive material may be comprised of interconnected conductive elements (not shown) or of isolated conductive elements 123 as shown in FIG. 3. Such conductive elements may be periodically arranged in the gradient structure, forming an array of elements in each cell and in each layer of the gradient structure. The conductive elements may extend over one or several layers in the longitudinal direction of the cell. In an alternative, the conductive elements may only be arranged at the topmost/and or bottommost layer of the gradient structure as shown in FIG. 3. Alternatively, the conductive elements may be arranged with an offset with respect to the conductive elements in the subsequent layers along the longitudinal direction of the cell.

In yet an alternative, the gradient structure may be provided with an additional layer of a conductive material, such as a frequency selective surface (FSS), which is arranged to transmit, reflect, filter or absorb wavelengths within at least one predetermined bandwidth range. In one example, the frequency selective surface may be provided on the surface of a skin.

Figure 4A:
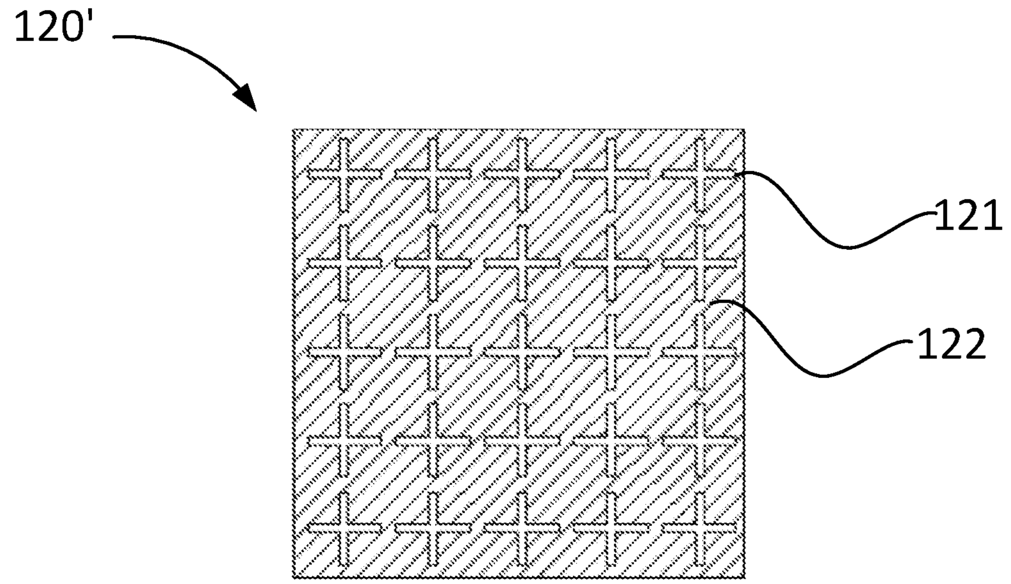
FIG. 4*a* and FIG. 4*b* show examples of frequency selective surfaces, FSS.
Figure 4B:
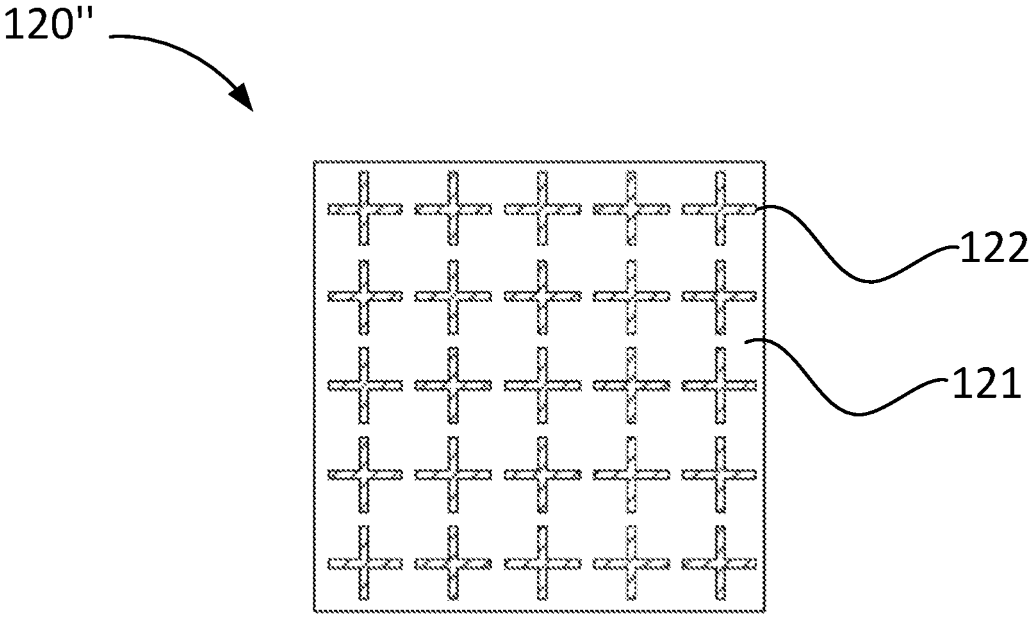

A frequency selective surface typically comprises of a substrate, such as a composite material (e.g. fibreglass laminate), onto which a pattern of a conductive material is added. The pattern may have any shape, for example having the shape of a plus or minus sign, a dot or any other geometrical shape. Two examples of frequency selective surfaces, 120', 120" are shown in FIGS. 4*a* and 4*b*. The dashed portions 122 in FIGS. 4*a* and 4*b* correspond to conductive portions, while the white portions 121 corresponds to apertures, i.e. absence of conductive material. The apertures corresponds to areas of the additional layer through which the electromagnetic signal may be transmitted. An example of a conductive material which may be used for the frequency selective surface is copper. The frequency selective surface 120' shown in FIG. 4*a* is an inverted surface as compared to the frequency selective surface 120" shown in FIG. 4*b* and vice versa. The conductive layer may be arranged to act as a band-pass filter, i.e. being arranged to pass frequencies within a certain range and to reject or attenuate frequencies outside that range. Alternatively, the conductive layer may be arranged to act as a band stop filter, i.e. to pass most frequencies unaltered, but attenuate or reflect frequencies in a specific range to very low levels.

Figure 5:
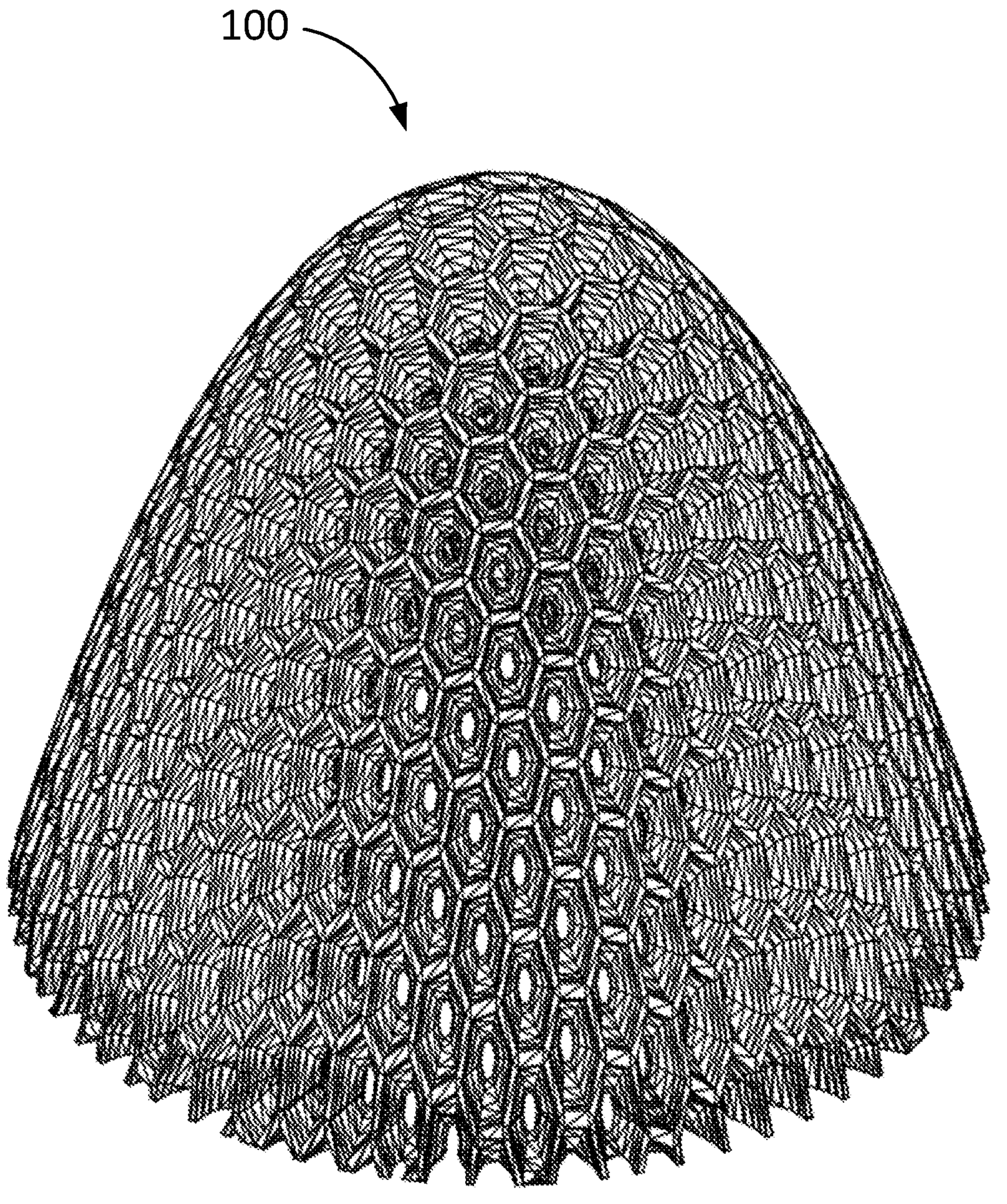
FIG. 5 shows a curved gradient structure according to an example of the present disclosure.

The gradient structure 100 may be arbitrarily shaped depending on its application, for example, the structure may be planar as shown in FIG. 2*a*. Alternatively, and as shown in FIG. 5, the gradient structure 100 may be curved.

In a further example, the gradient structure may be designed as a lens (not shown). The purpose of such gradient structure may be to focus electromagnetic signals from a transmitter, thereby improving the performance of the transmitter.

In one example, a plurality of gradient structures may be joined side by side and/or on top of each other. Each of the plurality of gradient structures may have the same cell diameter $d_{cell}$ and geometrical shape. Alternatively, each of the plurality of gradient structures may have a cell diameter and a geometrical shape which is different from the cell diameter and the geometrical shape of an adjacent gradient structure. In yet an example, the cell diameter and/or geometrical shape may vary also within each gradient structure of the larger gradient structure as discussed above. Further, gradient structures having different wall thicknesses may be joined. In yet an example, especially when a plurality of gradient structures are joined side by side, gradient structures of different shapes, i.e. planar or curved, may be joined together. Gradient structures comprising different dielectric materials may be joined as well.

Figure 6:
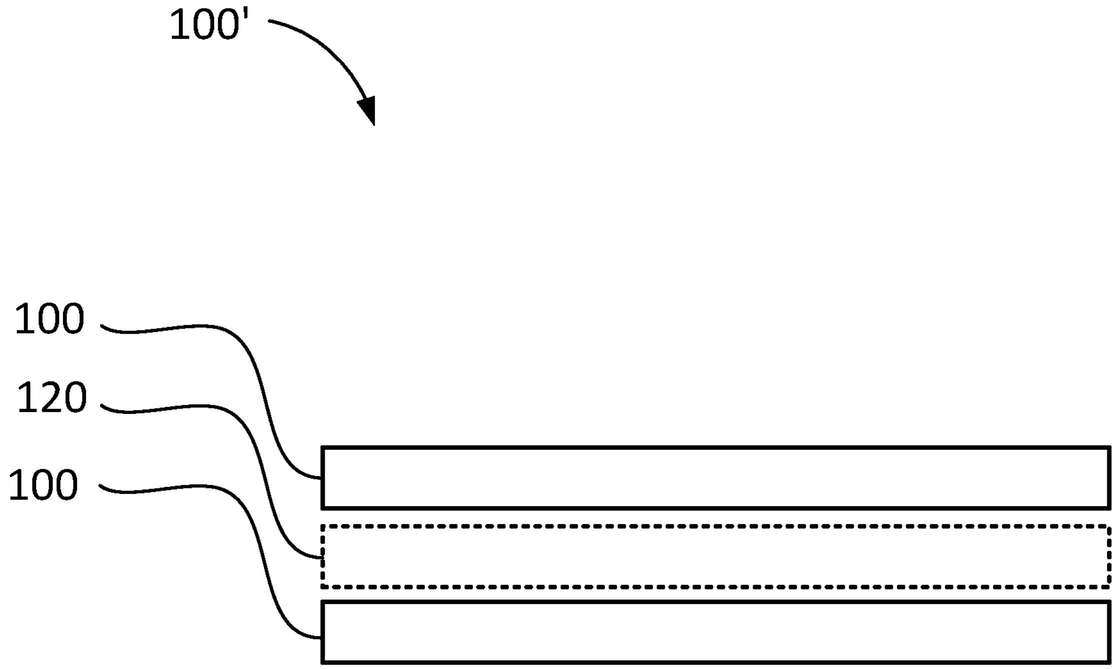
FIG. 6 shows a side view of two gradient structures being joined on top of each other and being separated by an additional layer according to an example of the present disclosure.

A structure comprising a plurality of joined gradient structures on top of each other may further be separated by a continuous or non-continuous layer of at least one additional material, such as a conductive material, a skin or composite material. The conductive layer may be a frequency selective surface as discussed above. FIG. 6 illustrates an example of two gradient structures 100 being joined on top of each other and which are separated by a layer of an additional layer 120.

Figure 7A:
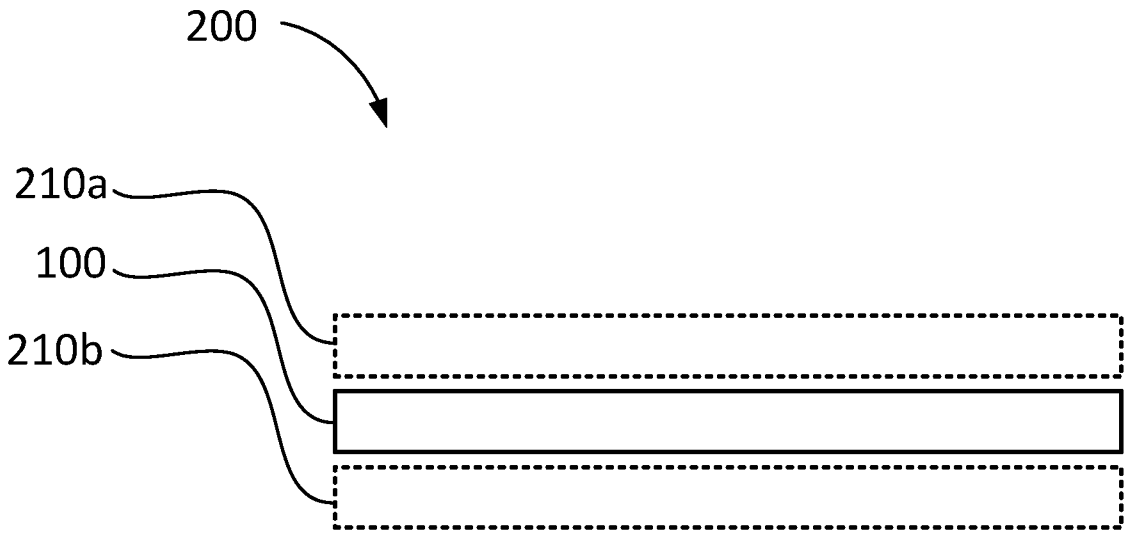
FIGS. 7*a* and 7*b* show side views of a cover structure according to examples of the present disclosure.

FIG. 7*a* illustrates a side view of a cover structure 200. The cover structure may for example be a radome, i.e. an antenna enclosure. The cover structure 200 comprises the at least one gradient structure 100 and at least one skin 210*a*, 210*b*. The skin(s) 210*a*, 210*b* may be attached to a topmost and/or a bottommost portion of the gradient structure 100. The skin(s) 210*a*, 210*b* may be arranged to cover at least a portion of the gradient structure 200. The purpose of the skin is to protect the gradient structure 100 against external conditions, such as weather and mechanical stress. Further, the skin should have the ability to transmit/reflect electromagnetic signals within the at least one bandwidth range in which the gradient structure operates. The skin(s) may have any shape which is suitable for the gradient structure 100, a plurality of joined gradient structures and/or the application. The skin may be made of a rigid material, such as a composite material. The skin may be attached to the gradient structure by an adhesive.

Alternatively, a so-called "bonding prepreg" is used which is adhesive and adheres to the surface of the gradient structure. In yet an alternative, the skin(s) is integrated in the gradient structure. In yet an alternative, the skin may be attached to the gradient structure by any fastening means, such as screws and/or rivets. The thickness of the skin(s) may be chosen depending on the application of the cover structure 200. Typically, the thickness of the skin is in the range of 1 mm.

Upon transmission of electromagnetic signals, reflections typically occur within the skin(s) 210*a*. 210*b*. The gradient structure 100 may be designed such that the thickness of the walls 111 may be selected to obtain a permittivity of each layer of the gradient structure such that reflections in the gradient structure substantially cancel the reflections in the gradient structure caused by the skin 210*a*, 210*b*. Thereby, the transmittance of the gradient structure is optimized. Alternatively, the gradient structure may be designed such that the thickness of the walls 111 is selected to obtain a permittivity of each layer of the gradient structure 100 such that reflections in the gradient structure increase reflections in the gradient structure caused by the skin 210*a*, 210*b*. Thereby, the reflectance of the gradient structure is optimized.

Figure 7B:
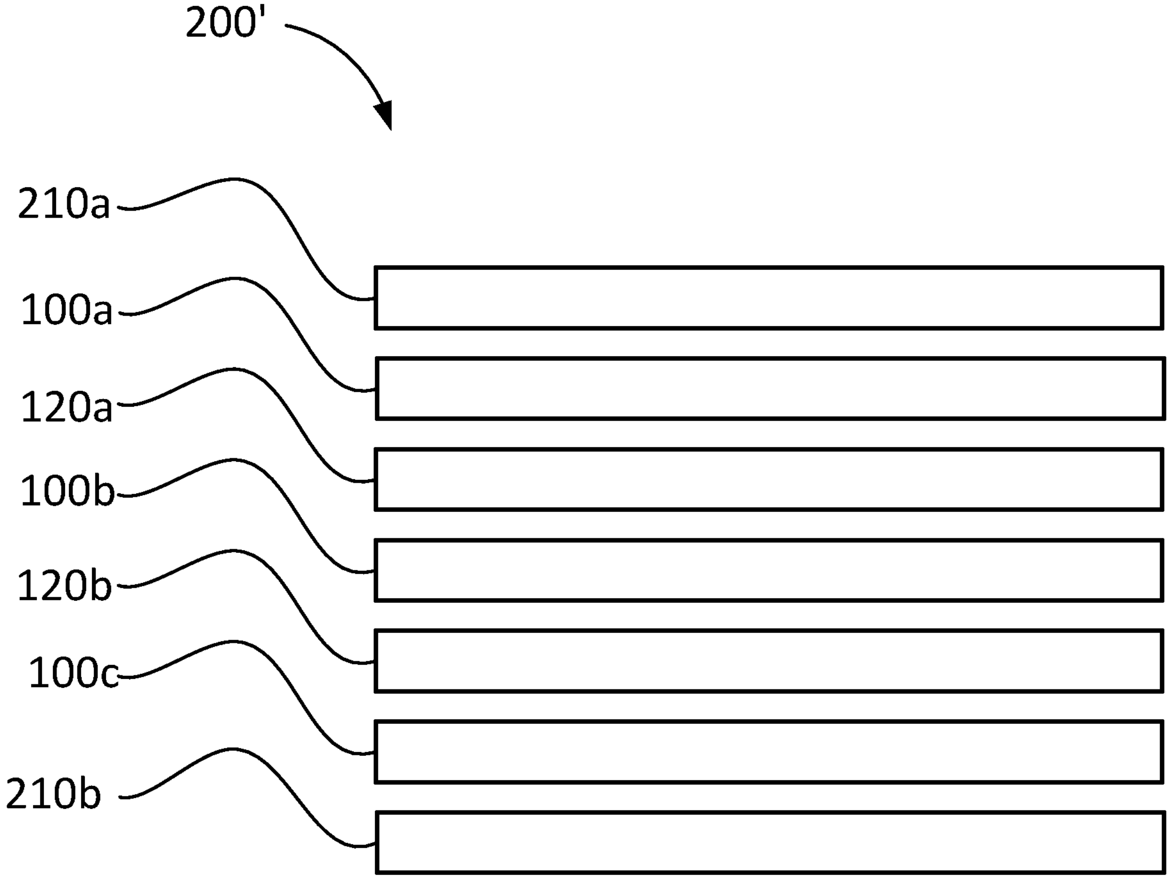

In FIG. 7*b*, another example of a cover structure 200' is illustrated. The cover structure 200' in FIG. 7*b* comprises three gradient structures 100*a*, 100*b*, 100*c* which are joined on top of each other, wherein two additional layers 120*a*, 120*b*, such as a frequency selective surface, are sandwiched between adjacent gradient structures. As discussed above, the gradient structures 100*a*, 100*b*, 100*c* may, but need not, have the same cell diameter and/or geometrical shape. Further, the cells of the gradient structures 100*a*, 100*b*, 100*c*, may, but need not, have the same wall thickness. The additional layers 120*a*, 120*b*, may, but need not, be the same type of layer.

Figure 8A:
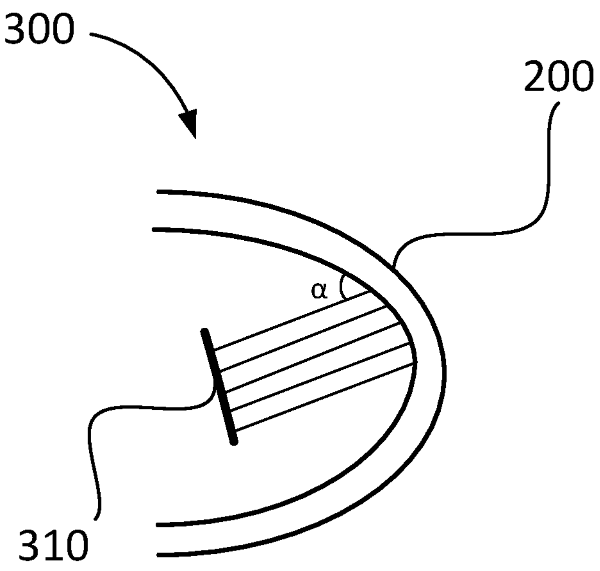
FIG. 8*a* and FIG. 8*b* show examples of a system comprising a cover structure according to the present disclosure.
Figure 8B:
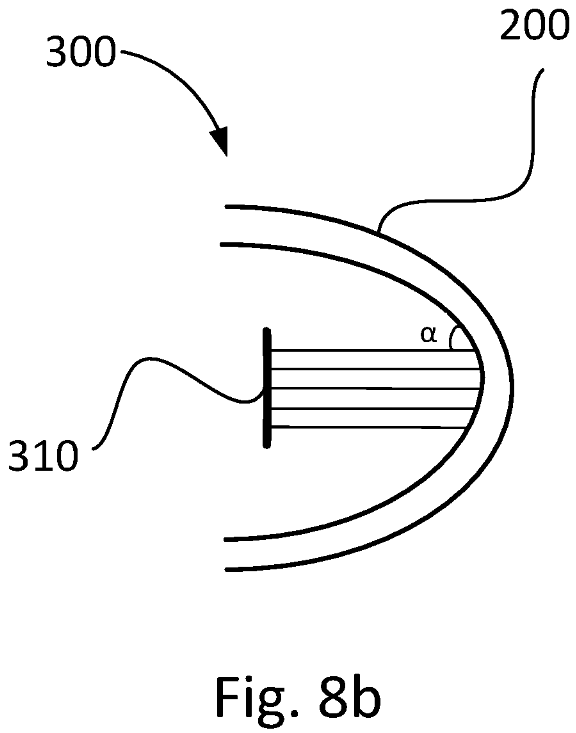

In FIGS. 8*a* and 8*b* examples of a system 300 comprising a cover structure 200 and a transmitter and/or receiver 310 is illustrated. The system 200 may comprise at least one transmitter and/or receiver 310, wherein each transmitter/receiver being arranged to transmit/receive electromagnetic signals of at least one predetermined bandwidth. As illustrated in FIGS. 8*a* and 8*b* the angle of incidence a of an electromagnetic signal to the cover structure 200 is different depending on how the transmitter/receiver 310 is directed within the cover structure 200. Hence, the at least one transmitter and/or receiver may be arranged within the cover structure such that electromagnetic signals of at least one predetermined bandwidth range may be transmitted/reflected by the cover structure. In addition, the shape of the cover structure may be taken into account when arranging the transmitter/receiver within the cover structure. Further, the cover structure may comprise different gradient structures in different portions of the cover structure, such that the cover structure has the ability to transmit and/or reflect different bandwidth ranges in different directions.

Figure 9:
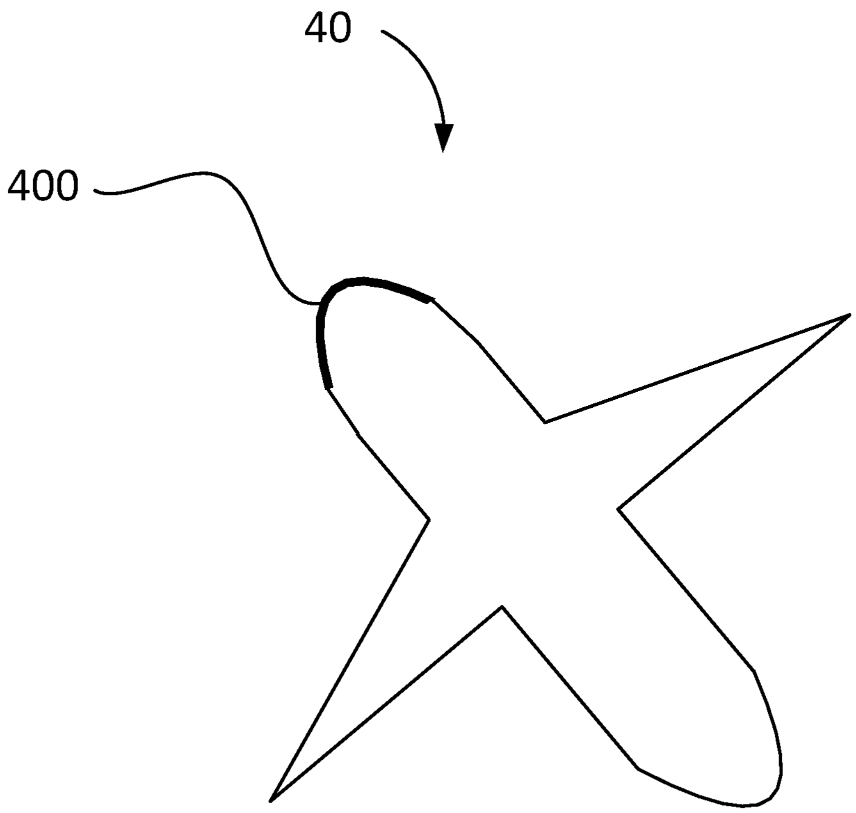
FIG. 9 shows an example of a structure element having integrated the therein a system according to the present disclosure.

FIG. 9 shows an example of an aircraft 40 comprising a structure element 400.

The system described above may be integrated in a structure element 400. In such case, an outer surface of the cover structure 200 may form a part of a surface of the structure element. The outer surface of the cover structure may for example be the skin of the cover structure. The structure element 400 may be a portion of a stationary object, such as a portion of a building. Alternatively, the structure element may be a portion of a moving object, such as an aircraft, a road vehicle or a watercraft. For example, the structure element may be a portion of a nose, tail, wing or a side of an aircraft. Further, the stationary object or moving object may comprise a plurality of structure elements which may be arranged at different portions of the stationary or moving object.

The cover structure of a system may have any shape, i.e. planar, curved etc., which may be adapted to the structure element.

Figure 10:
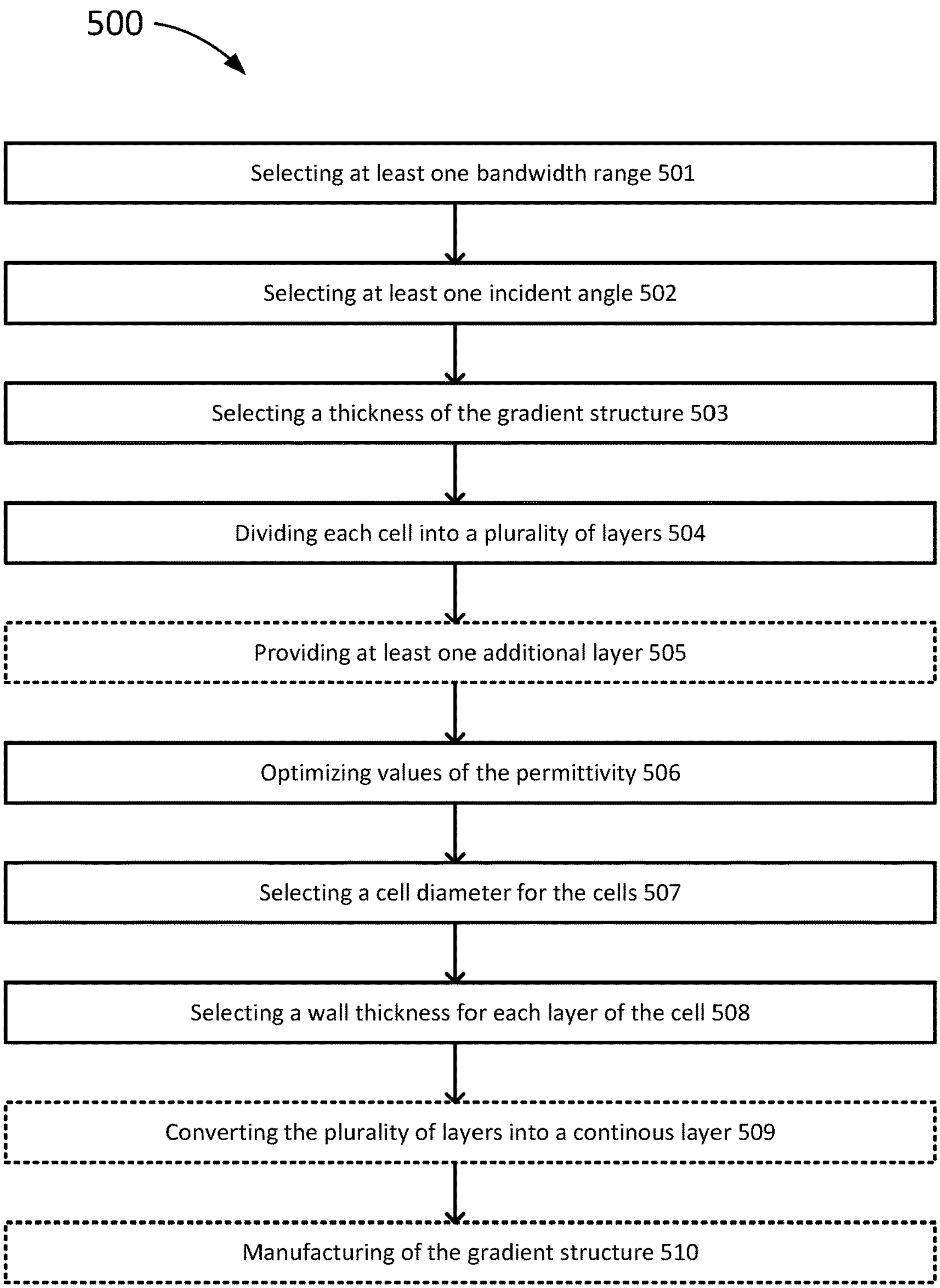
FIG. 10 shows schematically a method for optimizing the transmittance and/or reflectance of an electromagnetic signal of a gradient structure according to the present disclosure.

FIG. 10 shows a method 500 for optimizing the transmittance and/or reflectance of an electromagnetic signal of a gradient structure, said gradient structure comprising a plurality of interconnected cells, wherein each cell comprises a through cavity surrounded by walls.

The method comprises a step of selecting at least one bandwidth range 501, within which the gradient structure should transmit and/or reflect the electromagnetic signal. The at least one bandwidth range may for example be one large bandwidth or a plurality of independent frequency bands. The at least one bandwidth range may be selected depending on the application of the gradient structure, such as depending on the operating bandwidths of the at least one transmitter and/or receiver arranged within a cover structure comprising the gradient structure.

The method further comprises a step of selecting at least one incident angle 502 of a transmitter and/or receiver arranged within the gradient structure. The incident angle corresponds to the angle α between the gradient structure and the electromagnetic signal to a receiver and/or from a transmitter arranged within a gradient structure. All angles from signals that the gradient structure is exposed to may be selected.

The method further comprises a step of selecting thickness of the gradient structure 503. Typically, a minimum and a maximum thickness of the gradient structure may be selected. The minimum value may be selected such that the gradient structure does not become too weak and physically break upon use. The maximum value may be selected depending on the application of the gradient structure, for example such that the gradient structure may not become too thick in a cover structure or a structure element.

The method further comprises dividing each cell into a plurality of layers 504 extending across a longitudinal direction of the cell. The number of the layers may depend on the thickness of the gradient structure and/or on the limitation of the manufacturing equipment. The numbers of layers may be in the range of ten, but may be either more or fewer than that.

Thus, the method may further comprise an optional step of providing at least one additional layer 505 with a known permittivity to the topmost and/or bottommost portions of the gradient structure prior to the step of dividing each cell into a plurality of layers. As discussed above, the additional layer may for example be a skin or a conductive layer. Hence, the additional layers may be taken into account in the method of optimizing the transmittance and/or reflectance of an electromagnetic signal. For example, the thickness of the walls may be selected to obtain a permittivity of each layer of the gradient structure 100 such that reflections in the gradient structure substantially cancel or increase reflections in the gradient structure caused by the skin 210*a*, 210*b*, depending on if the gradient structure is arranged to transmit or reflect an electromagnetic signal.

The method further comprises a step of optimizing values of the permittivity 506 for each of the plurality of layers in order to maximize the performance of the gradient structure. As discussed above, also optional additional layers, such as skin(s) and or conductive layer(s), may be taken into account into the step of optimizing values of the permittivity 506. The permittivity of each layer of the gradient structure is optimized such that the performance is maximized for the gradient structure and optional additional layers. Hence, the performance of a cover structure may be optimized by the present method. The permittivity may be optimized in order to maximize the performance for the at least one bandwidth range and incidence angles selected in the steps 501 and 502 above. Any appropriate optimization method may be used. In one example the gradient descent projection method may be used. In the step of optimizing the values, the best value of the permittivity may be selected for each of the layers, i.e. the permittivity providing for the highest transmittance and/or the highest reflectance for the at least one predetermined bandwidth of the gradient structure or for the gradient structure and optional additional layers. The step of optimizing values 506 of the permittivity may be performed by any optimization method, such as the gradient descent projection method. In the step of optimizing values of the permittivity 506, the transmittance or reflectance of the gradient structure may be calculated by a scattering parameter calculation method for stratified media.

The method further comprises a step of selecting a cell diameter of the cells 507, wherein the cell diameter is smaller than the smallest wavelength within the at least one bandwidth range. The cell diameter is selected such that the gradient structure appears homogeneous to the electromagnetic signal, and grating lobes, i.e. lobes that occur when the lobe from a transmitter is split into a plurality of lobes upon being transmitted through the gradient structure, from the gradient structure is avoided. Hence, it may be desirable that the cell diameter is as small as possible. However, the manufacturing equipment, e.g. a 3D printer, may determine the limit of the smallest cell diameter obtainable.

The method further comprises a step of selecting the wall thickness 508 for each layer of the cell such that the permittivity of each of the plurality of layers corresponds to the optimized permittivity values. To achieve a wall thickness which gives a permittivity equal to the optimized permittivity, a method called inverse homogenization may be used.

Division of each cell into a plurality of layers may be efficient for the purpose of optimizing the transmittance/reflectance of the gradient structure. However, upon manufacturing it is not necessary that the layers are a manufactured as sharp layers. Hence, the method may, but need not, comprise a step of converting the plurality of layers into a continuous layer 509 in which the plurality of layers may merge into one another. Hence, in the manufacturing step below, the cells may be manufactured with the plurality of layers extending across a longitudinal direction of the cell as in the optimization steps. Alternatively, the plurality of layers may be manufactured as a continuous layer extending across a longitudinal direction of the cell.

The method may further comprise a step of manufacturing the gradient structure and/or optional additional layers 510 by 3D printing.

The gradient structure according to the present disclosure may preferably be manufactured by 3D printing, i.e. additive manufacturing. In the case of the gradient structure being comprised in a cover structure, optional additional conductive materials, additional layer(s) and/or skin(s) of the cover structure may be manufactured by 3D printing as well. In one example, a cover structure comprising at least one gradient structure and at least one skin is printed in one single piece. Alternatively, the different parts, such as the gradient structure, skin(s) and optional additional layers of the cover structure may be printed separately and be joined after printing.

The invention claimed is:

1. A gradient structure (100) for transmitting and/or reflecting an electromagnetic signal, comprising a plurality of interconnected cells (110), wherein each cell comprises a through cavity (112) surrounded by walls (111), wherein the walls of each cell have a gradually varying thickness along a longitudinal direction of the cavity of each cell.

2. The gradient structure (100) according to claim 1, wherein each cell (110) is built up of a plurality of layers extending across a longitudinal direction of each cell.

3. The gradient structure (100) according to claim 2, wherein the density is gradually varying in different layers of the cells (110).

4. The gradient structure (100) according to claim 1, wherein the gradient structure is configured to transmit and/or reflect an electromagnetic signal within at least one predetermined bandwidth range.

5. The gradient structure (100) according to claim 4, wherein a thickness of the walls ($t_h$) of the cells is selected to obtain a permittivity of each layer of the gradient structure such that the gradient structure is transmissive or reflective to an electromagnetic signal, within the at least one predetermined bandwidth range.

6. The gradient structure (100) according to claim 1, wherein the cells (110) of the plurality of interconnected cells have a different diameter ($d_{cell}$) and/or geometrical shape.

7. The gradient structure (100) according to claim 1, wherein the cells (110) has a hexagonal shape or any other geometrical shape.

8. The gradient structure (100) according to claim 4, wherein the gradient structure is provided with an additional layer (120), such as a conductive layer, a frequency selective surface, or a skin, which is arranged to transmit, reflect, filter or absorb wavelengths within the at least one predetermined bandwidth range.

9. The gradient structure (100) according claim 8, comprising a plurality of gradient structures arranged on top of each other, wherein the plurality of gradient structures being separated by at least one additional layer (120).

10. The gradient structure (100) according to claim 4, wherein the diameter of each cell ($d_{cell}$) is smaller than the smallest wavelength within the at least one predetermined bandwidth range.

11. The gradient structure (100) according to claim 1, wherein the walls (111) of the cells comprises a dielectric material.

12. The gradient structure (100) according to claim 1, wherein the cavity (112) of the cells comprises a dielectric material, which is different from the dielectric material of the walls (111).

13. The gradient structure (100) according to claim 11, wherein each cell (110) further comprises a conductive material, such as a metal or a conductive polymer.

14. The gradient structure (100) according to claim 1, wherein the gradient structure is planar or curved.

15. The gradient structure (100) according to claim 1, wherein the gradient structure is designed as a lens.

16. A cover structure (200) comprising at least a gradient structure (100) according to claim 1, further comprising at least one skin (210*a*, 210*b*) attached to the topmost and/or bottommost portion of the gradient structure.

17. The cover structure (200) according to claim 16, wherein the thickness of the walls (111) is selected to obtain a permittivity of each layer of the gradient structure (100) such that reflections in the gradient structure substantially cancel or increase reflections in the gradient structure caused by the skin (210*a*, 210*b*).

18. The cover structure (200) according to claim 16, wherein the at least one skin (210*a*, 210*b*) is made of a composite material.

19. A system (300) comprising at least one transmitter and/or receiver (310) and a cover structure (200) according to claim 16.

20. A structure element (400) having integrated therein the system (300) according to claim 19, wherein an outer surface of the cover structure (200) forms part of a surface of the structure element.

21. A method (500) for optimizing the transmittance and/or reflectance of an electromagnetic signal of a gradient structure, said gradient structure comprising a plurality of interconnected cells, wherein each cell comprises a through cavity surrounded by walls, wherein the walls of each cell have a gradually varying thickness along a longitudinal direction of the cavity of each cell, said method comprising:

selecting at least one bandwidth range (501), within which the gradient structure should transmit and/or reflect the electromagnetic signal, selecting at least one incident angle (502) of a transmitter and/or a receiver arranged within the gradient structure, selecting a thickness of the gradient structure (503), dividing each cell into a plurality of layers (504) extending across a longitudinal direction of the cell, optimizing values of the permittivity (506) for each of the plurality of layers, in order to maximize the performance of the gradient structure, selecting a cell diameter (507) for the cells, wherein the cell diameter is smaller than the smallest wavelength within the at least one bandwidth range, selecting the wall thickness (508) for each layer of the cell such that the permittivity of each of the plurality of layers corresponds to the optimized permittivity values.

22. The method according to claim 21, comprising a step of providing at least one additional layer (505) with a known permittivity, to the topmost and/or bottommost portions of the gradient structure prior to the step of dividing each cell into a plurality of layers.

23. The method (500) according to claim 21, wherein the step of optimizing values (506) of the permittivity is performed by any optimization method, such as the gradient descent projection method.

24. The method (500) according to claim 21, wherein in the step of optimizing values (506) of the permittivity, the transmittance or reflectance of the gradient structure is calculated by a scattering parameter calculation method for stratified media.

25. The method (500) according to claim 21, wherein inverse homogenization is performed in the step of selecting a wall thickness for each layer of the cell (508) such that the permittivity of each of the plurality of layers corresponds to the optimized permittivity values.

26. The method (500) according to claim 21, comprising a step of converting the plurality of layers into a continuous layer (509).

27. The method (500) according to claim 21, further comprising a step of manufacturing the gradient structure and/or optional additional layers by 3D printing (510).

* * * * *